United States Patent [19]
Kaye

[11] Patent Number: 4,953,008
[45] Date of Patent: Aug. 28, 1990

[54] METHOD AND APPARATUS FOR UNIFORM SATURATION, HUE AND LUMINANCE CORRECTION

[75] Inventor: Michael C. Kaye, Agoura, Calif.

[73] Assignee: Encore Video, Inc., Hollywood, Calif.

[21] Appl. No.: 340,872

[22] Filed: Apr. 19, 1989

Related U.S. Application Data

[63] Continuation-in-part of Ser. No. 159,587, Dec. 15, 1987, which is a continuation-in-part of Ser. No. 904,692, Sep. 8, 1986, abandoned.

[51] Int. Cl.$^5$ .............................................. H04N 9/64
[52] U.S. Cl. ........................................ 358/22; 358/27; 358/28
[58] Field of Search ...................... 358/22, 27, 28, 80

[56] References Cited

U.S. PATENT DOCUMENTS

| | | | |
|---|---|---|---|
| 3,255,305 | 6/1966 | Chatten | 358/21 R |
| 3,558,806 | 1/1971 | Monahan | 358/30 |
| 3,678,182 | 7/1972 | Boxman et al. | 358/22 |
| 3,959,813 | 5/1976 | Legler | 358/22 |
| 4,051,520 | 9/1977 | Davidse et al. | 358/22 |
| 4,109,278 | 8/1978 | Mendrala et al. | 358/22 |
| 4,410,908 | 10/1983 | Belmares-Sarabia et al. | 358/30 |
| 4,500,919 | 2/1985 | Schreiber | 358/78 |
| 4,525,736 | 6/1985 | Korman | 358/28 |
| 4,533,938 | 8/1985 | Hurst | 358/28 |
| 4,763,186 | 8/1988 | Belmares-Sarabia et al. | 358/22 |
| 4,811,084 | 3/1989 | Belmares-Sarabia et al. | 358/22 |
| 4,862,251 | 8/1989 | Belmares-Sarabia et al. | 358/22 |

FOREIGN PATENT DOCUMENTS

| | | | |
|---|---|---|---|
| 58-172082 | 10/1983 | Japan | 358/22 |
| 172083 | 10/1983 | Japan | 358/22 |
| 930749 | 5/1982 | U.S.S.R. | 358/22 |

OTHER PUBLICATIONS

Monahan and Dischert, Color Correction Techniques for Television Cameras Journal of the SMPTE, Sep. 1969, pp. 696–700.

Primary Examiner—John W. Shepperd
Attorney, Agent, or Firm—Pretty, Schroeder, Brueggemann & Clark

[57] ABSTRACT

Video signal color correction is accomplished by selecting for color correction areas of the chrominance plane defining sectors in polar coordinates. Both the angle and the width of the sector can be changed to select precisely the desired signals for color correction. Specifically, component color difference video signals which only lie within a fixed hue sector are transmitted from an input to an output. Responsive to a first control signal, the difference signals are rotated through an angle which corresponds to a selected hue sector relative to the fixed hue sector in which the component color signals are to be corrected. The rotated difference signals are applied to the input to produce at the output an isolated color signal only when the difference signals lie within the selected hue sector. The width of the fixed hue sector is reduced responsive to a second control signal. Thus, the first and second control signals permit selection of the angle and the width of the sector in which the difference signals are to be corrected.

11 Claims, 13 Drawing Sheets

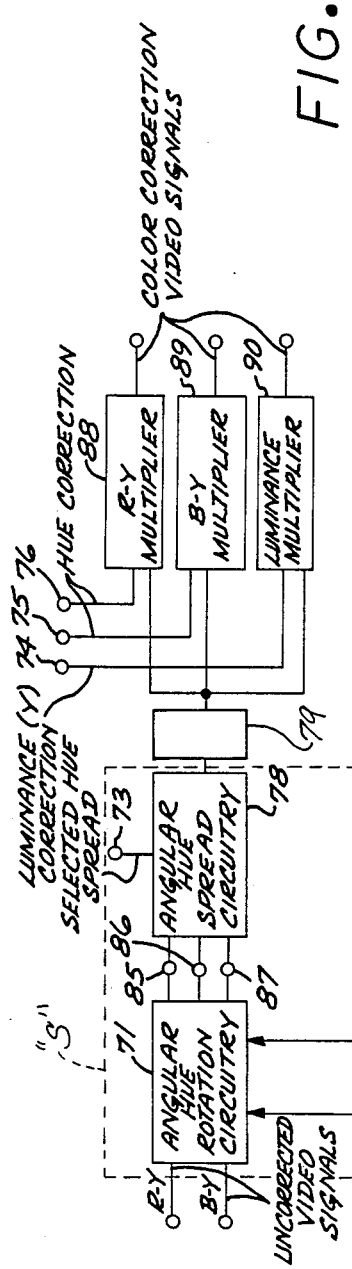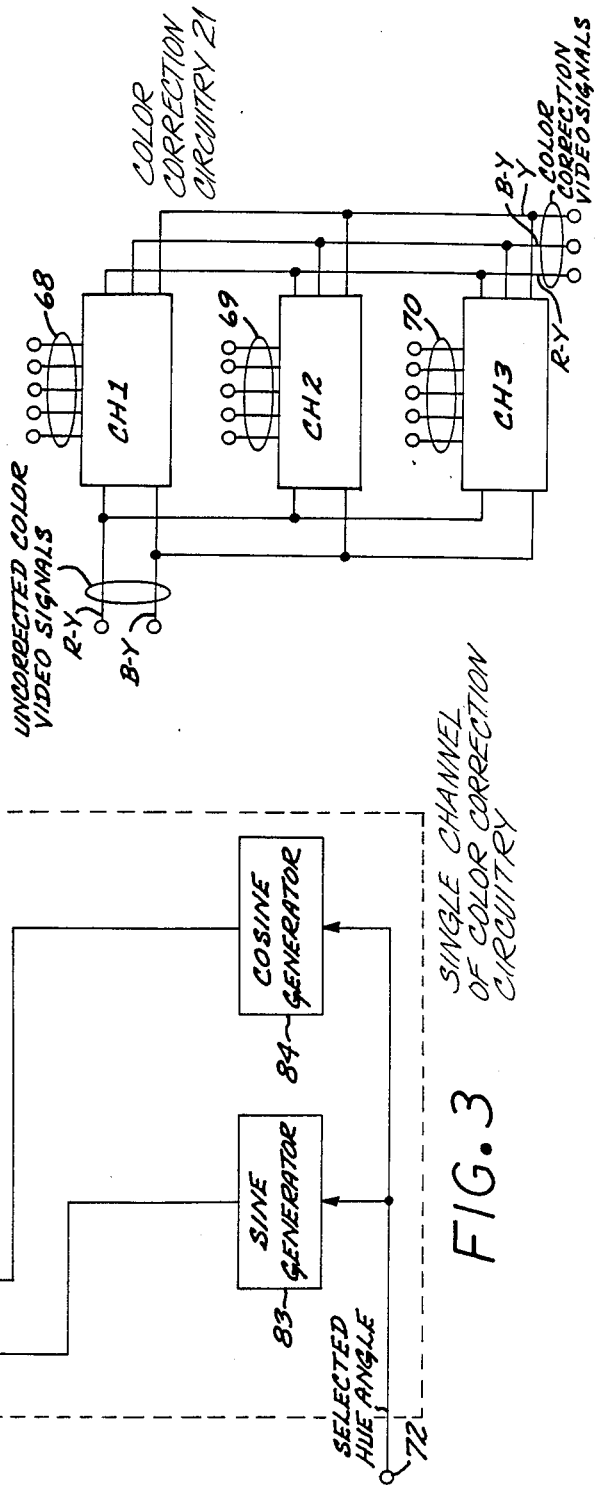
FIG. 2
FIG. 3

Fig. 15
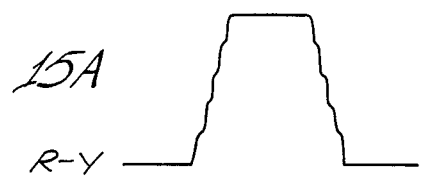
15A
R-Y
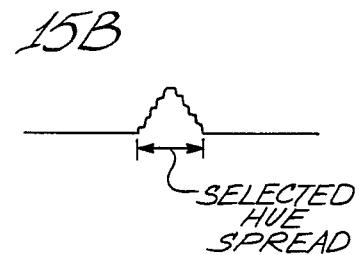
15B
SELECTED HUE SPREAD
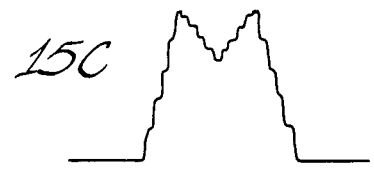
15C
15D
15F
15E
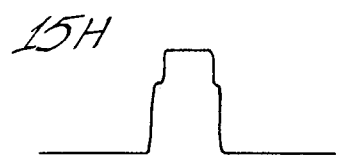
15H
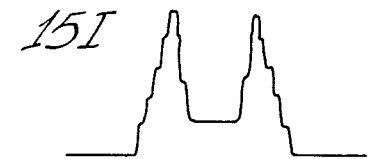
15G
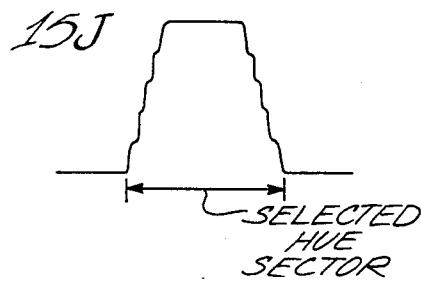
15J
SELECTED HUE SECTOR
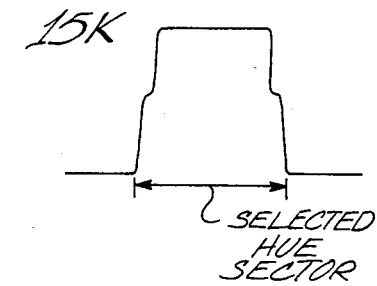
15K
SELECTED HUE SECTOR

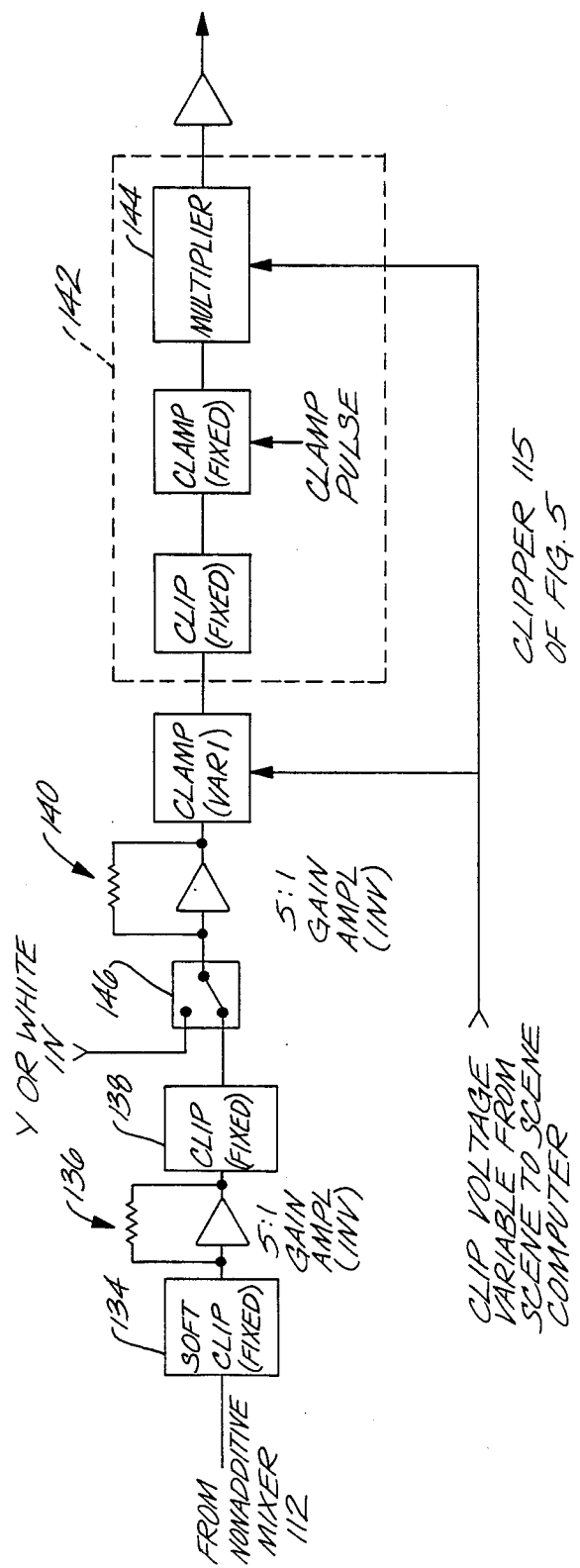

METHOD AND APPARATUS FOR UNIFORM SATURATION, HUE AND LUMINANCE CORRECTION

REFERENCE TO RELATED APPLICATIONS

This application is a Continuation-In-Part of application Ser. No. 159,587, filed Dec. 15, 1987, which is a Continuation-in-part of Serial No. 904,692, filed Sep. 8, 1986 now abandoned.

BACKGROUND OF THE INVENTION

This invention relates to correcting video color or neutral signals and, more particularly, to a method and apparatus for selectively producing video color correction signals or color corrected resultant signals having a uniform hue, saturation or luminance.

In video color recording, the images may be represented by either of two sets of signals. One signal set is red/green/blue (RGB). The other signal set is luminance (Y) and color difference signals, i.e. red minus luminance (R-Y) and blue minus luminance (B-Y).

In the course of production of television and video color recordings, it is sometimes desirable to correct selectively the colors of the subject images. Many years ago Monahan et al. disclosed a non-linear matrixing device for color correction in U.S. Pat. No. 3,558,806. This matrixing device operates upon the red/green/blue signals to permit independent adjustment of the hue and saturation of the three primary colors, red, green, and blue, and the secondary colors, cyan, yellow, and magenta. When an object made up of more than one color is to be color corrected, a coordinated adjustment of both colors is required.

Recently, Korman disclosed in U.S. Pat. No. 4,525,736 color modification apparatus which operates upon the color difference signals known as I and Q, rather than the primary and secondary color signals. The color signals to be corrected are selected by limit circuits which determine when the difference signals lie between prescribed boundaries in the chrominance plane. These boundaries define rectangular regions in the chrominance plane which do not correspond to the polar coordinate color corrections actually made by the colorist. As a result, the colorist may encounter difficulty in selecting the signals to be color corrected.

Kaye, PCT Application No. PCT/US87/02240, Publication Date Mar. 24, 1988, describes a video signal color correction apparatus which selects for color correction areas of the chrominance plane defining sectors in polar coordinates. Both the angle and the width of the sector can be changed to select precisely the desired signals for color correction. Specifically, component color video signals which only lie within a fixed hue sector are transmitted from an input to an output. Responsive to a first control signal, the difference signals are rotated through an angle which corresponds to a selected hue sector relative to the fixed hue sector in which the component color signals are to be corrected. The rotated difference signals are applied to the input to produce at the output an isolated color signal only when the difference signals lie within the selected hue sector. The width of the fixed hue sector is reduced responsive to a second control signal. The first and second control signals permit selection of the angle and the width of the sector in which the component signals are to be corrected.

In many situations, ordinary color signals include signals representing hues adjacent to one another but which have varied saturations. In a typical scene, the adjacent hues may represent the hues on a person's face or hues in a background, etc., wherein the adjacent hues do not have all the same saturation. In the Kaye specification, the hues found in a given hue sector can be isolated and added to or subtracted from the uncorrected signals in order to modify or entirely eliminate the corresponding hues. Where the original hues are only modified, saturations may be increased or decreased typically an amount in proportion to the relative saturations of the original signals. However, it is sometimes desirable to modify the saturations of the isolated hues such that the differences between the saturations of adjacent hues remains approximately the same. Additionally, there are instances where it is desired to have the saturations of all of the isolated hue signals substantially equal.

There is a need for a color correction system which can produce color correction signals where the saturations of hue signals to be corrected are modified the same amount for all isolated hues, which can produce hue signals in a color correction signal having equal saturation levels, or which can produce one color correction signal having the isolated hues with equal saturations at a first level and a second color correction signal having the same isolated hues with equal saturations at a second level.

There is also a need for a color correction system which can take the "white" signal portions of the color video and apply them to a plurality of correction channels to modify isolated grey levels without affecting other grey levels. There is also a need for a color correction system which can take the luminance, or Y, signals in the color video set of signals and apply them to a plurality of correction channels to modify either or all of the uncorrected luminance signals, the uncorrected hue signals or the saturation levels of those hue signals. In other words there is a need for a color correction system having a plurality of correction channels which can accept isolated signals, white signals or luminance signals in order to modify the hue, saturation, luminance or grey levels in a video picture. The disclosed system takes advantage of each of these possible sources of video signals for isolation and subsequent use as correction signals.

SUMMARY OF THE INVENTION

According to the invention, a correction system is provided which can modify isolated signals in a picture having respective saturation levels by increasing or decreasing the levels a constant amount for all isolated signals or which can produce corrected signals having identical levels. In a preferred embodiment, a color correction circuit is provided which can modify isolated hue signals having respective saturation levels by increasing or decreasing the saturation levels a constant amount for all hue signals or which can produce corrected hue signals having identical saturation levels. Additionally, the hues and the luminance of the corresponding video color signals can be uniformly changed and the greys or neutrals can be uniformly changed. A color correction system for manipulating signals representing color or neutrals includes input means for accepting signals representing colors defining hues and respective saturations. A color correction circuit for accepting the signals from the input includes means for defining a hue region and including an output to which is passed only signals representing the hues in the hue region. The color correction circuit also includes signal processing means coupled to the output of the hue region defining means for accepting the signals representing the hues in the hue region and for processing the signals to produce signals having the same hues and having substantially equal saturations. Means are included for combining the signals from the input means With the signals from the signal processing means and producing resultant signals and for passing the resultant signals to an output. In a preferred embodiment, the signal processing means clips the hue signals so that the hue signals have substantially equal saturations. The gain of the incoming isolated signals are increased prior to clipping in order to provide a suitable correction signal. In the preferred embodiment, the corrected signals are then applied to an R-Y multiplier, a B-Y multiplier and a luminance multiplier, and modified as appropriate. The outputs from the multipliers are applied to respective output busses.

In a further embodiment of the present invention, the luminance signals are applied to a plurality of correction circuits for isolation using a clipper circuit in the output of a hue spread circuit and modified and output onto a correction buss just as the color signals would be. These isolated signals provide a substitute set of signals to be applied to R-Y, B-Y and luminance multipliers to modify color or luminance signals. The white signal can be used also to modify grey levels by either increasing or decreasing the level or by adding color to the grey level.

Means are also disclosed for compensating for the loss of gain resulting from the clipping of the isolated signal prior to input to the signal processing means.

BRIEF DESCRIPTION OF THE DRAWINGS

The features of a specific embodiment of the best mode contemplated of carrying out the invention are illustrated in the drawings in which:

FIG. 2 is a schematic block diagram of the multichannel color correction circuitry represented in FIG. 3 is a schematic block diagram of one channel of the color correction circuitry represented in FIG. 2;

FIG. 15 shows a group of curves representing DC signals in the R-Y channel representing an uncorrected signal, correction signals and corrected video signals.

FIG. 16 is a schematic diagram of a signal loss compensating circuit according to one embodiment of the present invention.

DETAILED DESCRIPTION OF THE SPECIFIC EMBODIMENT

Figure 1:
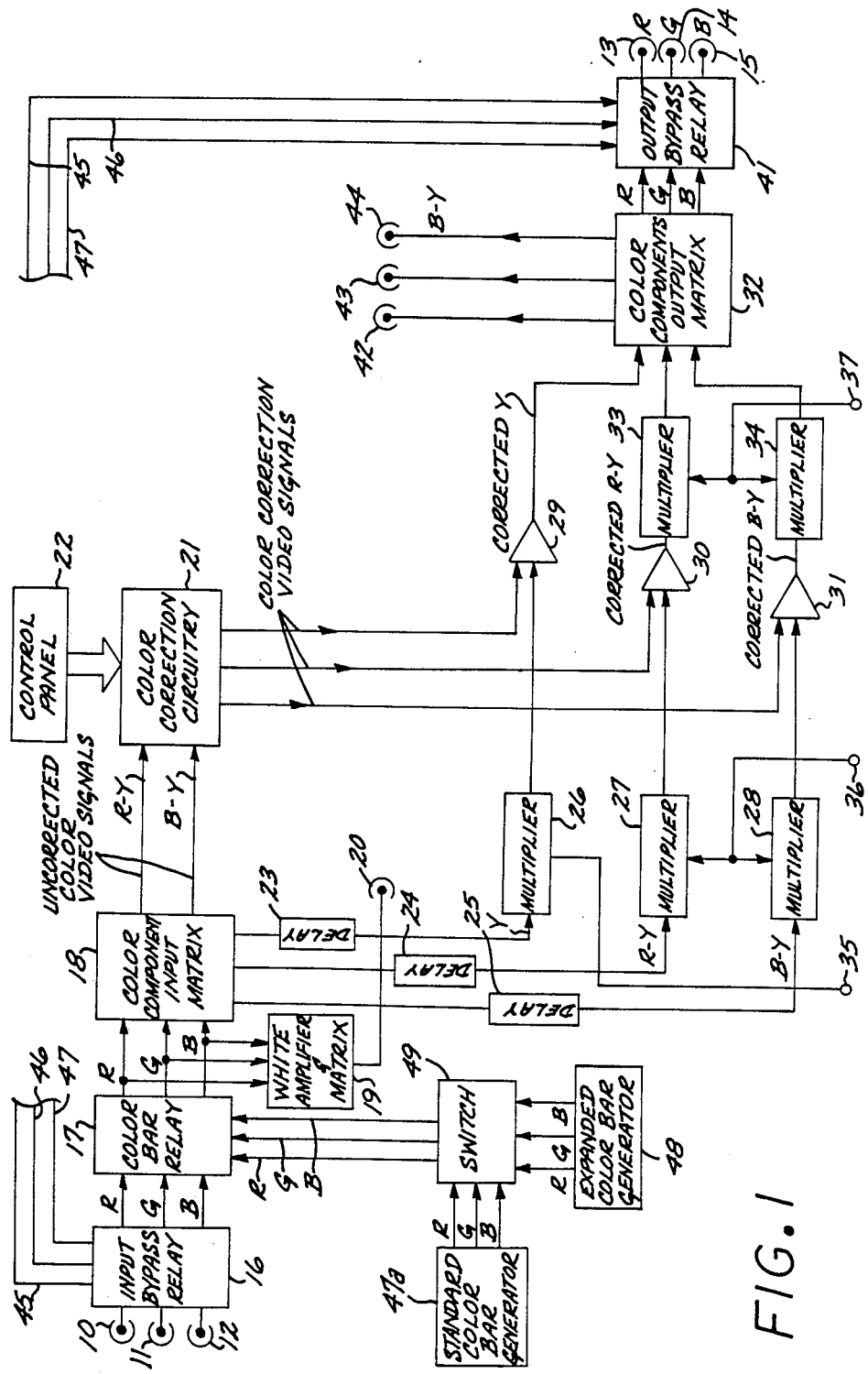
FIG. 1 is a schematic block diagram of a color correction system incorporating principles of the invention.

In FIG. 1 a color correction system has video input terminals 10, 11 and 12 for receiving red/green/blue component color signals, respectively, to be color corrected and video output terminals 13, 14 and 15 at which the corrected red/green/blue component color signals appear. Input terminals 10,11 and 12 are connected by an input bypass relay 16, and a color bar relay 17 to a color component input matrix 18. The red/green/blue component color signals are coupled to a white amplifier and matrix 19, which produces a white signal at a video output terminal 20. In matrix 18 the red/green/blue component color signals are converted to difference signals, R-Y and B-Y, and a luminance signal Y. The difference signals are coupled to color correction circuitry 21, which as described in greater detail in connection with FIGS. 2 through 5 modifies, i.e. corrects the difference signals responsive to control signals from a control panel 22. The luminance signal and the difference signals from matrix 18 are Coupled through delay circuits 23, 24 and 25, respectively, and multipliers 26, 27 and 28, respectively, to one input of summing amplifiers 29, 30 and 31, respectively. The color correction signals from circuitry 21 are coupled to the other input of each of summing amplifiers 29, 30 and 31 for combining the luminance and difference signals with the color correction signals. The corrected luminance signal appears at the output of summing amplifier 29. The corrected difference signal R-Y appears at the output of summing amplifier 30. The corrected difference signal B-Y appears at the output of summing amplifier 31. Summing amplifier 29 is directly connected to a color component output matrix 32. Summing amplifier 30 is connected by a multiplier 33 to matrix 32. Summing amplifier 31 is connected by a multiplier 34 to matrix 32.

A control terminal 35 to which a luminance level control signal (e.g., a range of +or−5 volts DC) is applied is connected to multiplier 26, to permit adjustment of the level of the luminance signal Y. A control terminal 36 to which a saturation control signal (e.g., a range of or−5 volts DC) is applied is connected to multipliers 27 and 28 to permit adjustment of the saturation level of the uncorrected R-Y and B-Y difference signals. As a result, it is possible to reduce, to the point of black and white if desired, the saturation of the uncorrected portions of the color signals. A control terminal 37 to which a saturation level control signal (e.g., a range of +or−5 volts DC) is applied is connected to multipliers 33 and 34 to permit adjustment of the saturation level of the corrected R-Y and B-Y difference signals.

The red/green/blue component color signals from matrix 32 are coupled through an output bypass relay 41 to video output terminals 13, 14 and 15, respectively. Corrected luminance signal Y and difference signals R-Y and B-Y pass directlY through matrix 32 to video output terminals 42, 43 and 44, respectively. Matrix 18 and 32 are conventional circuits for converting between red/green/blue component color signals and luminance and difference signals. Video buses 45, 46 and 47 are connected between input bypass relay 16 and output bypass relay 41 to permit direct transmission of the red/green/blue component color signals from input terminals 10, 11 and 12 to output terminals 13, 14 and 15, bypassing the color correction circuitry.

For purposes of testing the described color correction system and facilitating the establishment of the desired color correcting control signals by the colorist, a standard six color bar generator 47a and an expanded thirty color bar generator 48 are provided. Color bar generator 47a produces red/green/blue component color signals representing a color chart with a white bar and six color bars; namely, yellow, cyan, green, magenta, red and blue. As described in connection with FIGS. 11 and 12, color bar generator 48 produces red/green/blue component color signals representing an expanded thirty color bar chart. Either generator 47 or generator 48 is alternatively connected to color bar relay 17 by a switch 49. Color bar relay 17 permits the red/green/blue component color signals from one of the color bar generators to be substituted for the red/green/blue component color signals to be corrected.

Figure 11:
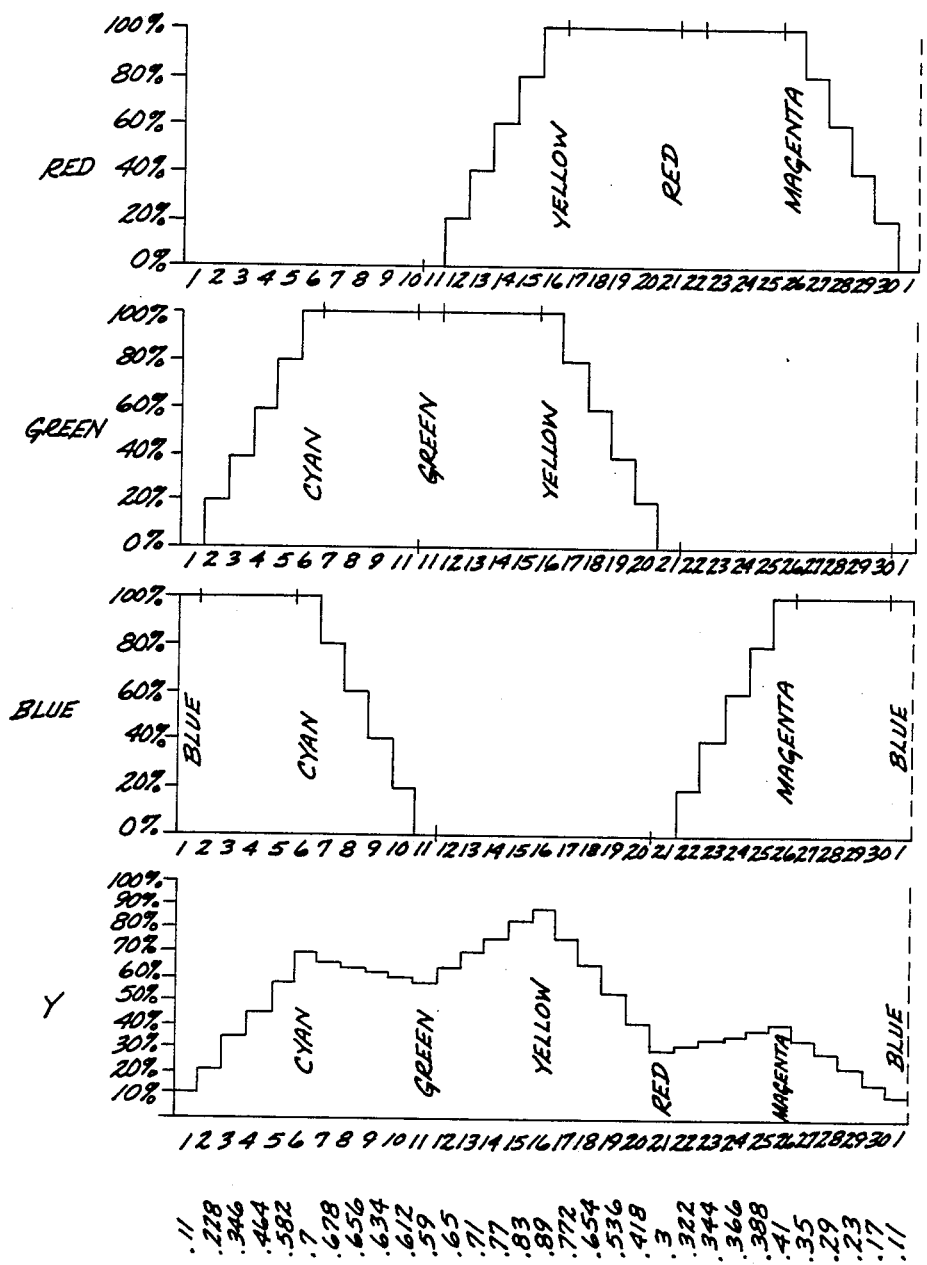
FIG. 11 is a diagram of the red/green/blue and luminance component color signals for an expanded thirty color bar chart.

Reference is made to FIG. 11 for diagrams representing the red/green/blue component color signals and the luminance signal for the expanded thirty color bar chart. The thirty color bars are represented on the abscissa and the normalized amplitude of the corresponding component signal is represented on the ordinate. Thus, for example, color bar #24, which lies between red and magenta, contains 100% of red, 0% of green and 60% of blue. (The precise normalized amplitude values of the luminance signal are presented below the corresponding color bar identifying numbers on the abscissa.) The color bars corresponding to the component (primary) color signals (i.e. color bars #1, 11 and 21) contain 100% of the corresponding component color signal and 0% of the remaining component color signals. The color bars corresponding to the secondary hues cyan, yellow and magenta (i.e. color bars #6, 16 and 26) contain 100% of two of the component color signals and 0% of the third (e.g. for yellow, 100% of red, 100% of green and 0% of blue). Each of the component color signals is 100% of green and 0% of blue). Each of the component color signals is 100% between the hues adjacent thereto (e.g. the red component color signal is 100% between yellow and magenta) and drops off in step-wise fashion at 20% increments moving away from the adjacent hues. The result is that on both sides of the color bars corresponding to the primary and secondary hues (color bars #1, 6, 11, 16, 21 and 26), the color bar is produced by the combination of a step-wise component and a 100% component (e.g. color bars #17 to 20 are composed of a step-wise component of green and a 100% component of red).

Figure 12:
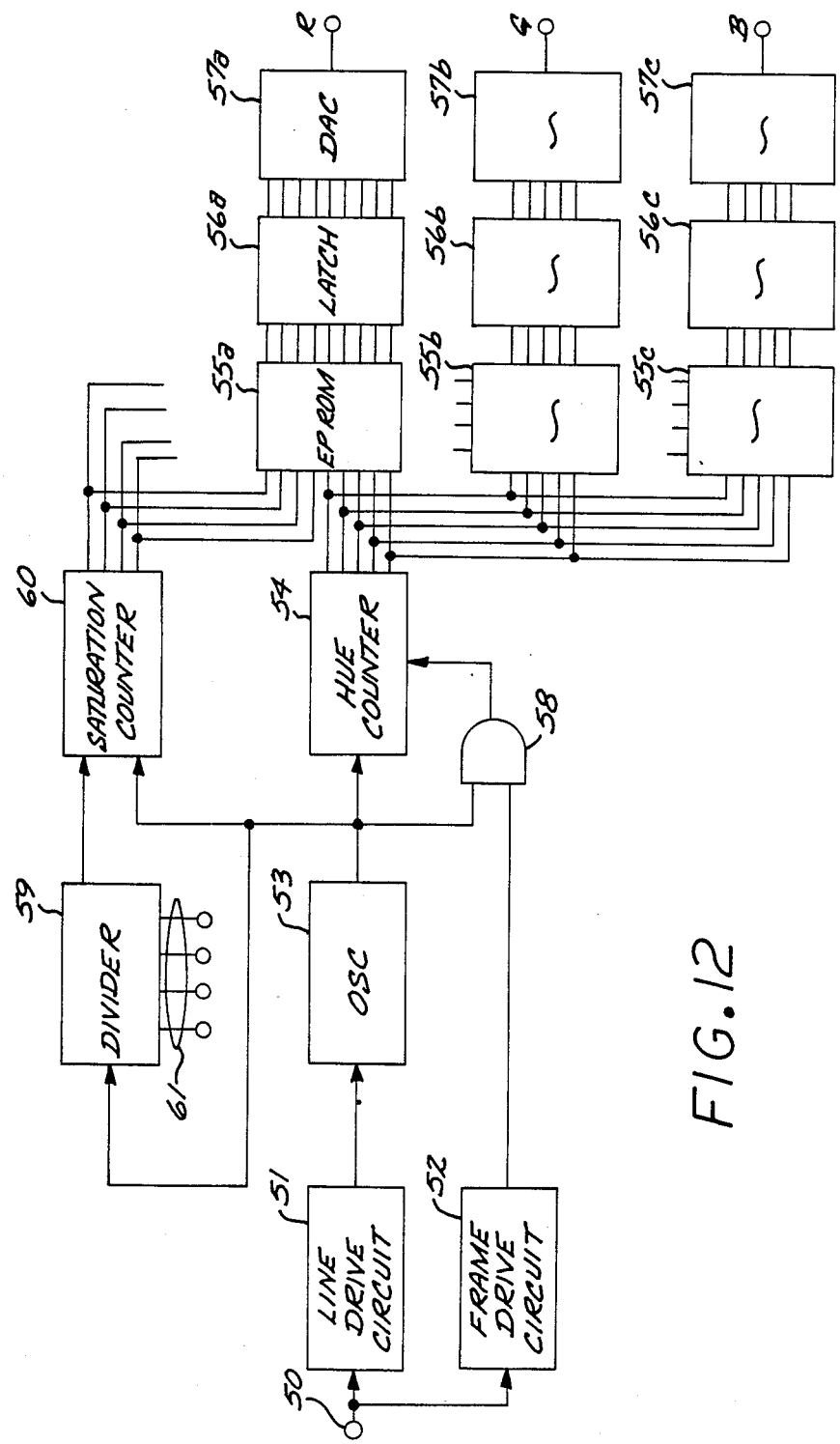
FIG. 12 is a schematic diagram of a color bar generator for producing component red/green/blue signals to create an expanded thirty color bar chart.

As depicted in FIG. 12, color bar generator 48 has an input terminal 50 for receiving a composite sync signal containing both horizontal and vertical synchronizing pulses. Terminal 50 is connected to a line drive circuit 51 and a frame drive circuit 52. Circuit 51 produces for each line of the video raster one line drive pulse which is applied as a synchronizing signal to an oscillator 53. Oscillator 53 produces pulses equal in number to the color bars to be displayed, i.e. thirty color bars. (If desired, thirty one colors bars could be displayed, the pure blue color bar, bar #1, being repeated at the end of the chart). Oscillator 53 drives a hue counter 54. Memory devices (EPROM) 55a, 55b and 55c, latches 56a, 56b and 56c, and digital-to-analog converters (DAC) 57a, 57b and 57c are provided to generate the red, green, and blue component color signals representing the color bars. DACs 57a, 57b and 57c are connected to switch 40 (FIG. 1). The output terminals of hue counter 54, six in number, are connected as address inputs to EPROMs 55a, 55b and 55c, in which are stored digital signals representing the red, green and blue component signal values shown in FIG. 11 for the various color bars. For example, in the memory location for color bar #24 in EPROM 55a a value corresponding to 100% of full amplitude is stored to represent the component red signal, in EPROM 55b a value corresponding to zero is stored, and in EPROM 55c, a value corresponding to 60% of full amplitude is stored. Latches 56a, 56b and 56c store the outputs of EPROMs 55a, 55b and 55c, respectively, while these outputs are converted to analog signals by DACs 57a, 57b and 57c, respectively.

The addresses from hue counter 54 are coordinated with the digital signals stored in the memory locations of EPROMs 55a, 55b, and 55c, so that during each video raster line, the digital signals generating the color bars are delivered by EPROMs 55a, 55b and 55c in the order shown in FIG. 11, i.e. color bars #1 to 30 in sequence. Once each frame, circuit 52 produces a drive pulse which is coupled through an AND gate 58 to the reset terminal of hue counter 54. For synchronization purposes, the output of oscillator 53 is also coupled to AND gate 58.

Preferably, the color bar generator is also capable of producing a plurality, e.g. fifteen different levels of saturation for each color bar, increasing in saturation from top to bottom. To this end, the output of oscillator 53 is connected to a divider 59, which produces one pulse for each of a plurality, e.g. sixteen, of applied pulses. The divisor can be changed by changing the binary signals applied to control terminals 61, e.g. if the signals are 1, 1, 1, 1, the divisor is one and only one level of saturation is produced and if the signals are 0, 0, 0, 0, the divisor is sixteen and sixteen levels of saturation are produced. The output of divider 59 is connected to a saturation counter 60. The outputs of saturation counter 60, four in number, are connected as address inputs to EPROMs 55a, 55b and 55c. In addition to digital signals representing the values of full saturation for each of the thirty color bars, EPROM 55a, 55b and 55c also store digital signals representing fourteen other saturation levels between zero and 100% for each color bar. In other words, each of EPROMs 55a, 55b and 55c have four hundred fifty memory locations. Each of the fifteen saturation levels are displayed on each color bar from top to bottom in decreasing saturation level, i.e., 100% is at the top of the color bar and 0% is at the bottom of the color bar. The result is a grid of changing hue in horizontal rows and changing saturation in vertical columns. After each sixteen lines of the video raster, the memory locations of EPROMs 55a, 55b and 55c corresponding to the hue for a different saturation level are addressed. The addresses generated by saturation counter 60 are coordinated with the digital signals stored in the memory locations of EPROMs 55a, 55b and 55c so as to address a group of memory locations in which are stored, the hue representative of the digital signals corresponding to one saturation level after the other. Thus, in the course of generation of each frame of the color bar chart, the proper memory location of each of EPROMs 55a, 55b and 55c is addressed in succession to provide an image which is a grid of horizontal rows of the same saturation and vertical columns of the same hue. To select a different number of saturation levels, the binary signals applied to control terminals 61 are simply changed to change the divisor.

Figure 6:
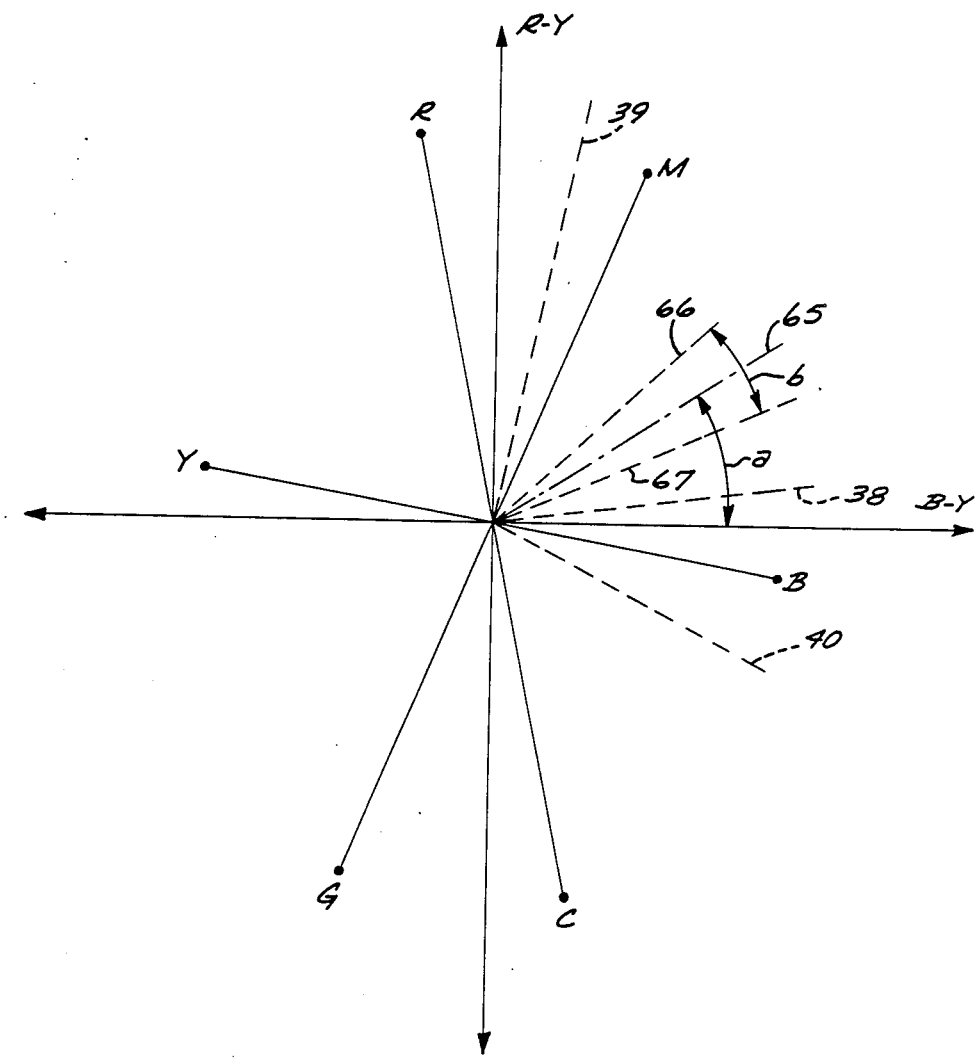
FIG. 6 is a diagram of the chrominance plane with the difference signals, R-Y and B-Y, as coordinates.

For a description of how the invention selects the desired hue angle and hue spread for color correction, reference is made to FIG. 6, which is a chrominance plane representation of the six primary and secondary component color signals. The abscissa represents the component color difference signal B-Y, i.e., blue minus luminance. The ordinate represents the component color difference signal R-Y, i.e., red minus luminance. The letters M, R, Y, G, C, and B represent the primary and secondary component color signals, magenta, red, yellow, green, cyan, and blue in a polar coordinate system. The angle represents the hue, i.e., color, and the radius represents the saturation level. A dot-dashed line 65 represents a desired hue angle, in this case between magenta and blue, to be color corrected at an angle a relative to the B-Y axis. Dashed lines 66 and 67 represent a desired sector with a color spread of angle b about hue angle over which the color correction is desired. The invention permits both the hue angle a and the sector spread or width b to be controlled so as to select any desired sector in the chrominance plane over which to introduce correction of the component color signals.

Reference is made to FIG. 2 for a description of color correction circuitry 21, which comprises a plurality of parallel channels CH1, CH2 and CH3. Any number of further channels could also be provided, depending upon the number of selective color corrections to be made. The R-Y and B-Y uncorrected video color signals from matrix 18 are coupled to each channel. A different set of five correction control signals is applied to each of channels CH1, CH2 and CH3 as represented at 68, 69 and 70. The correction control signals are DC, e.g., +or−0 to 5 volts, as distinguished from video, and remain fixed in value once set until a different correction is to be made.

The correction control signals are generated by the adjustment of potentiometers on control panel 22 by the colorist. Alternatively, the color control signals generated by the colorist at control panel 22 could be stored in a computer memory and called up by the computer in real time as the red, green, blue component color signals are being transmitted from input terminals 10, 11 and 12 to output terminals 13, 14 and 15 responsive to a frame counter in well-known fashion. Responsive to each set of control signals, a different color correction is introduced in each of channels CH1, CH2 and CH3. The outputs of channels CH1, CH2 and CH3 are additively combined such as, for example, by an operational amplifier (not shown) to produce R-Y, B-Y and Y video color correction signals which are added to the uncorrected video color signals B-Y, R-Y and Y from matrix 18 in summing amplifiers 29, 30 and 31, respectively (FIG. 1).

Reference is made to FIG. 3 for a description of channel CH1. Channels CH2, CH3 and any further channels desired to be added are identical to channel CH1. The R-Y and B-Y uncorrected video signals are applied to a color selection circuit "5" to angular hue rotation circuitry 71 through means for receiving video color component difference signals at an input of the angular hue rotation circuitry. The angular hue rotation circuitry defines a hue angle representing a hue signal to be passed from the receiving means to the means for transmitting correction video color component difference signals (described more fully below). The set of five correction control signals from control panel 22 are applied, respectively, to input control terminals 72, 73, 74, 75 and 76. A control signal representative of a first input signal in the for of the selected hue angle is applied to input terminal 72. Terminal 72 is connected to a sine generator 83 and a cosine generator 84. A signal representative of the sine of the selected hue angle is coupled from generator 83 to circuity 71. A signal representative of the cosine of the selected hue angle is coupled from generator 74 to circuitry 71. Responsive to these signals, circuitry 71 presents at an output terminal 86 a video signal having a maximum amplitude when the R-Y and B-Y uncorrected video signals form the selected hue angle and a decreasing amplitude moving away from the selected hue angle within the fixed hue sector and a zero amplitude for all other hue angles, i.e., all hue angles outside the fixed hue sector. Responsive to a second input signal in the form of a control signal representative of the selected hue spread applied to terminal 73, hue spread circuitry 78 reduces the width of the sector over which the signal appearing at terminal 86 is non-zero. The hue spread circuitry is coupled between the angular hue rotation circuitry 71 and multipliers 88–90 through the uniform signal processing means 79, described more fully below, for defining a hue sector containing the hue angle and representing hue boundaries outside of which hue signals representing hues outside of the hue sector are not passed to the uniform color signal processing means or to the multipliers 88–90. Thus, circuitry 78 produces an isolated color signal only when the R-Y and B-Y uncorrected video signals lie within the selected hue sector, which is the same or narrower than the fixed hue sector transmitted by circuitry 71. The isolated or selected color signal is applied to the uniform signal processor and then to one input of an R-Y multiplier 88, one input of a B-Y multiplier 89 and one input of a luminance multiplier 90. As will be discussed more fully below with respect to FIG. 14, the color correction system includes a switch to disable the uniform signal processor so that the isolated correction signals essentially pass directly to the multipliers. Terminal 74 is connected to the other input of multiplier 90 to multiply the signal representative of luminance correction by the isolated color signal or correction factor. Terminal 75 is connected to the other input of multiplier 89 to multiply the signal representative of the B-Y hue correction by the isolated color signal. Terminal 76 is connected to the other input of multiplier 88 to multiply the signal or correction factor representative of the R-Y hue correction by the isolated color signal. As a result, video signals representative of the color correction prescribed by the control signals applied to terminals 74, 75 and 76 over the hue sector prescribed by the control signals applied to terminals 72 and 73 and processed by the uniform signal processor 79, if turned on, are produced by multipliers, 88, 89 and 90. The signals are combined with corresponding video color correction signals from the other channels by means of operational amplifiers 62, 63 and 64.

Figures 4, 5:
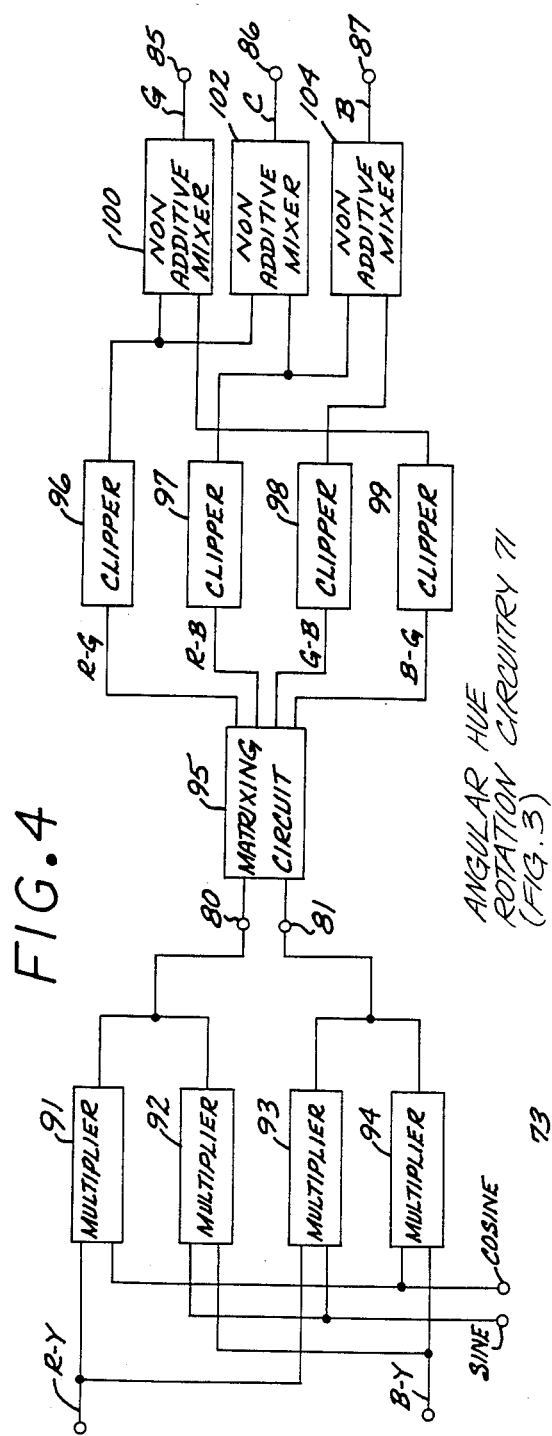
FIG. 4 is a schematic block diagram of the angular hue rotation circuitry represented in FIG. 3.
FIG. 5 is a schematic block diagram of the angular hue spread circuitry represented in FIG. 3.

Reference is made to FIG. 4 for a more detailed description of angular hue rotation circuitry 71. Multipliers 91, 92, 93 and 94 rotate the R-Y and B-Y uncorrected video signals under control of the sine and cosine representative signals. To this end, the R-Y signal and the cosine representative signal are applied to the inputs of multiplier 91; the B-Y signal and the sine representative signal are applied to the inputs of multiplier 92; the R-Y signal and the sine representative signal are applied to the inputs of multiplier 93; and the B-Y signal and the cosine representative signal are applied to the inputs of multiplier 94. The outputs of multiplier 91 and 92 are combined and applied to one input of a matrixing circuit 95. The outputs of multipliers 93 and 94 are combined and applied to the other input of matrixing circuit 95.

Figure 8:
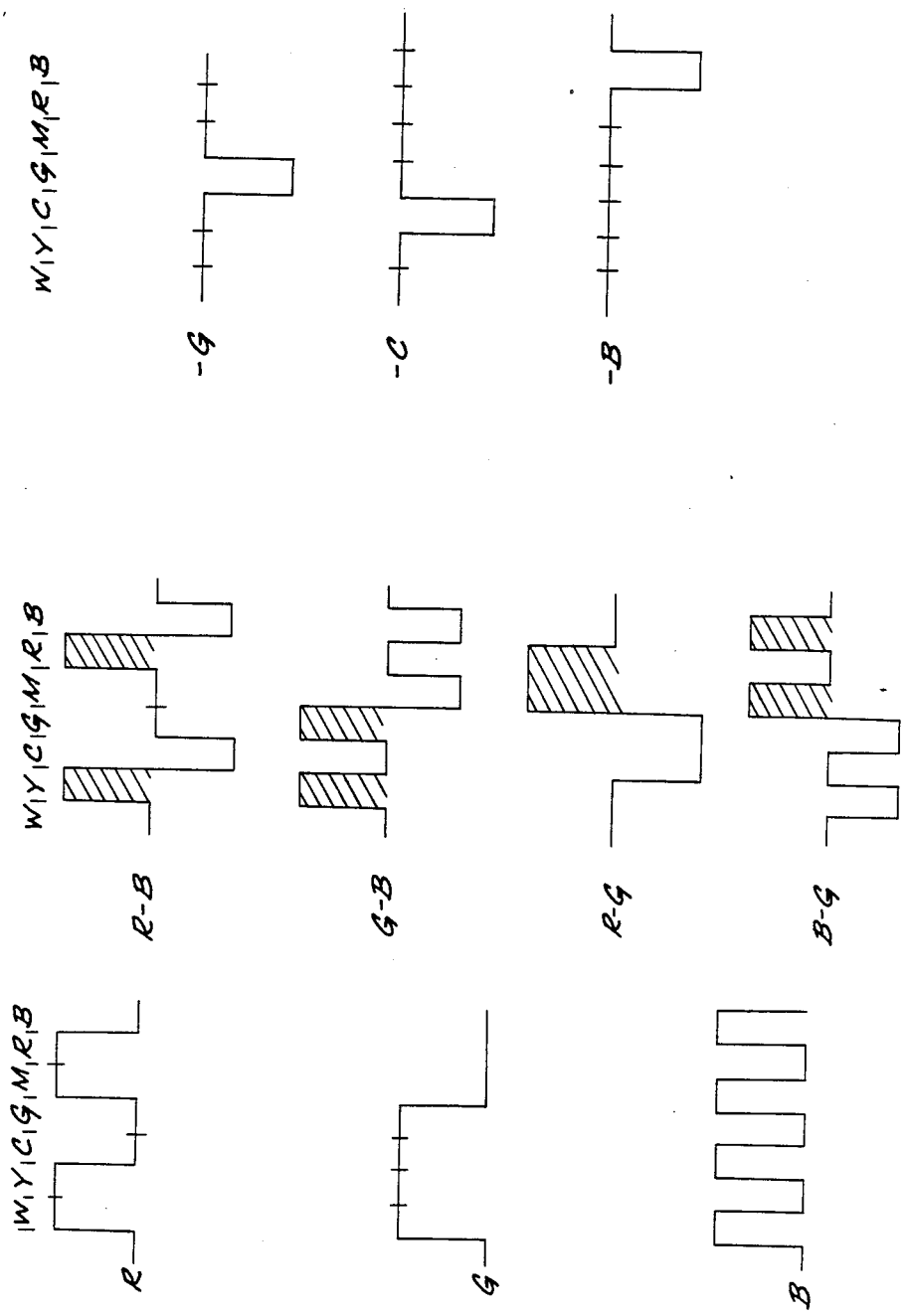
FIG. 8 is a collection of diagrams representing the component color signals for a standard six color bar chart.

In well known fashion, matrixing circuit 95 produces four color difference signals, namely, red minus green (R-G), red minus blue (R-B), green minus blue (G-B) and blue minus green (B-G). In this connection, reference is made to FIG. 8 for diagrams depicting red, green, and blue color component signals (left in FIG. 8), the difference signals produced by matrixing circuit 95 for a standard six color bar chart (center in FIG. 8), and the signals produced at the output of the angular hue rotation circuitry (right in FIG. 8). The R-G, R-B, G-B and B-G difference signals are applied to clippers 96, 97, 98 and 99, which remove the positive going (shaded in FIG. 8) portions from the difference signals. The negative going portions of the R-G and B-G difference signals are coupled to a non-additive mixer 100 having an output terminal 85. The negative going portions of the R-G and R-B difference signals are applied to a non-additive mixer 102 having an output terminal 86. The negative going portions of the R-B and G-B difference signals are applied to a non-additive mixer 104 having an output terminal 87. In the left column of FIG. 8, the R, G, and B component color signals are shown for a standard six color bar chart. In the center column, the difference signals R-B, G-B, R-G and B-G are shown. Clippers 96 to 99 remove the positive going portions of these signals. Non-additive mixers 100, 102 and 104 transmit only the most negative signal applied to their respective inputs, suppressing the positive going portions. The signals produced at output terminals 85, 86 and 87, by virtue of the processing of the stated difference signals by clippers 96 to 99 and mixers 100, 102 and 104 are depicted in the right column of FIG. 8 for a standard six color bar chart. As illustrated, the opposite, i.e., negative of the green (G) component signal appears at the terminal 85, the opposite of the cyan (C) component appears at the terminal 86, and the opposite of the blue (B) component signal appears at terminal 87. In summary, clippers 96 and 99 and mixers 100, 102 and 104 serve to transmit from matrixing circuit 95 to terminal 86 only video component color difference signals which lie within a fixed hue sector of preferably about 106°, i.e., the sector between green and blue centered on cyan. Only difference signals that lie within a sector between yellow and cyan and centered on green are transmitted to terminal 85. Only difference signals that lie within a sector between cyan and magenta and centered on blue are transmitted to terminal 87. Since the hue transmitted to output terminal 86 is cyan, which is located at an angle of −76.6° on the chrominance plane represented in FIG. 6, the selected hue angle in general is angle a minus 76.6°.

Figure 7:
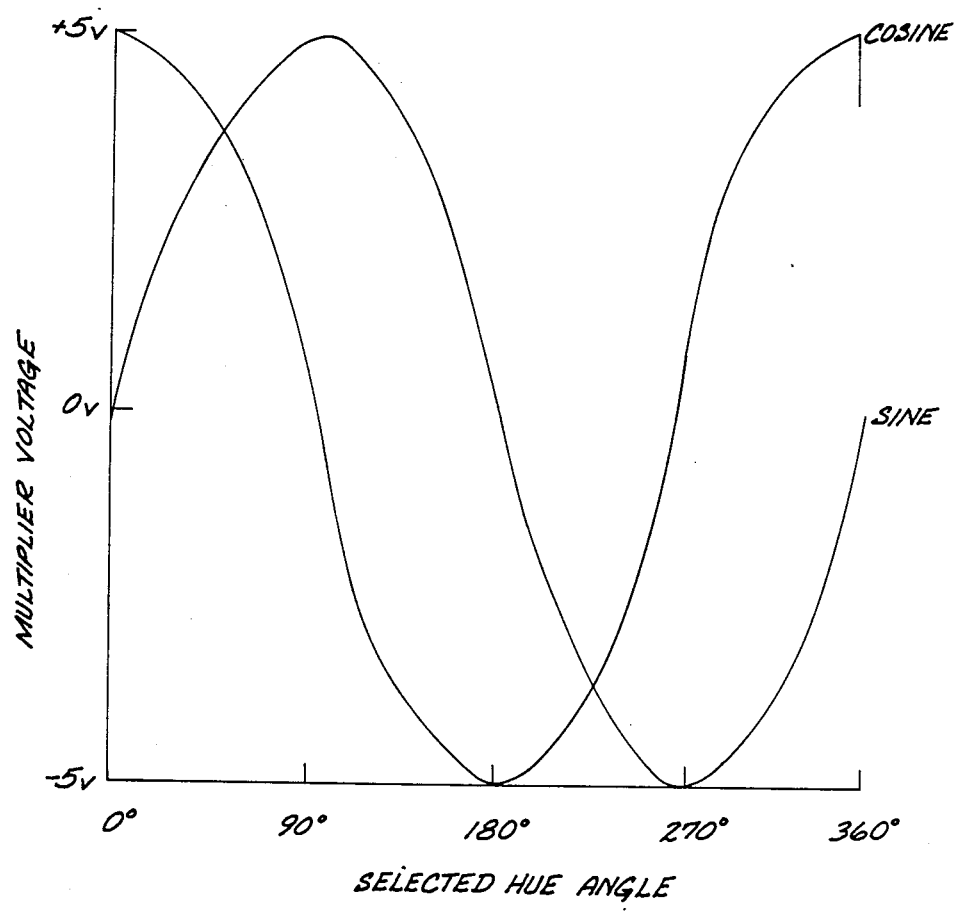
FIG. 7 is a diagram of sine and cosine wave forms used to describe the operation of the invention.

By varying the selected hue angle, multipliers 91 to 94 in essence rotate the uncorrected video signals applied thereto so as to permit any desired sector of hue in the chrominance plane found in the color difference signals, R-Y, B-Y, to be transmitted to terminals 85, 86 and 87 in place of green, cyan and blue. A few examples will illustrate this point with reference to FIG. 7, which represents the sine and cosine signals applied to multipliers 91 to 94 as a function of the selected hue angle. If the selected hue angle is 0°, the cosine signal is a maximum positive value and the sine signal is zero. As a result, the R-Y difference signal and the B-Y difference signal are transmitted at full amplitude by multipliers 91 and 94, respectively, to matrixing circuit 95, while transmission of the difference signals by multipliers 92 and 93 is blocked. When the selected hue angle is +90°, multiplier 93 transmits the R-Y difference signal to input terminal 81, and multiplier 92 transmits the B-Y difference signal to input terminal 80 at full amplitude, while transmission through multipliers 91 and 94 is blocked. With reference to FIG. 6, this is equivalent to rotating the R-Y and B-Y axes 90° in a counterclockwise direction and the hue sectors transmitted to output terminals 85, 86 and 87 change. Thus, difference signals centered at a hue between blue and magenta represented by a dashed line 38 at an angle 13.4° in relation to the origin (positive B-Y axis) in FIG. 6 are transmitted to output terminal 86, difference signals centered at a hue between red and magenta represented by a dashed line 39 at an angle of 77.1° in FIG. 6 are transmitted to output terminal 87, and difference signals centered at a hue between cyan and blue represented by a dashed line 40 at an angle of 330.8° in FIG. 6 are transmitted to output terminal 85. When the selected hue angle is 180°, multipliers 91 and 94 invert the polarity of the R-Y and B-Y difference signals, respectively, while transmission through multipliers 92 and 93 is blocked. This is equivalent to rotating the R-Y and B-Y axes in FIG. 6 by 180°.

Figure 9:
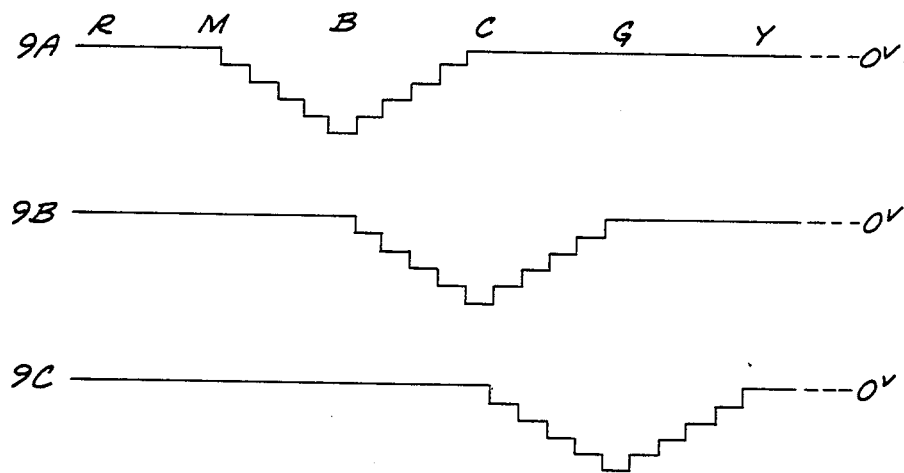
FIGS. 9A, 9B and 9C are diagrams representing the output signals of the angular hue rotation circuitry of FIG. 3 for a expanded thirty color bar chart.

Assuming application of the expanded thirty color bar difference signals to angular hue rotation circuitry 71, and a selected hue angle of 0°, FIGS. 9A, 9B and 9C represent the signal amplitude in volts at terminals 87, 86 and 85, respectively. As illustrated, the signal at terminal 87 is a maximum negative value at blue, drops off toward magenta and cyan, and is zero for all other hues, the signal at terminal 86 is a maximum negative value at cyan, drops off toward blue and green, and is zero at all other hues, the signal at terminal 85 is a maximum negative value at green, drops off toward cyan and yellow, and is zero at all other hues. As the selected hue angle increases and decreases from zero, the signals at terminals 87, 86 and 85 change in value, shifting as a unit back and forth in the hue spectrum relative to their values illustrated in FIGS. 9A, 9B and 9C.

With reference to FIG. 5, which depicts the hue spread circuitry, terminals 85 and 87 (FIG. 4) are connected to a non-additive mixer 110. The output of non-additive mixer 110 is coupled by an operational amplifier 111, supplying a preferably fixed gain to the signal from the non-additive mixer 110, to one input of a non-additive mixer 112. Terminal 86 is connected by an invertor 114 to the other input of non-additive mixer 112. The output of non-additive mixer 112 is coupled by a negative signal clipper 115 to a terminal 116, which serves as the output for circuitry 78. Terminal 73 is connected by a resistor 117 to the input of operational amplifier 111.

Figure 10:
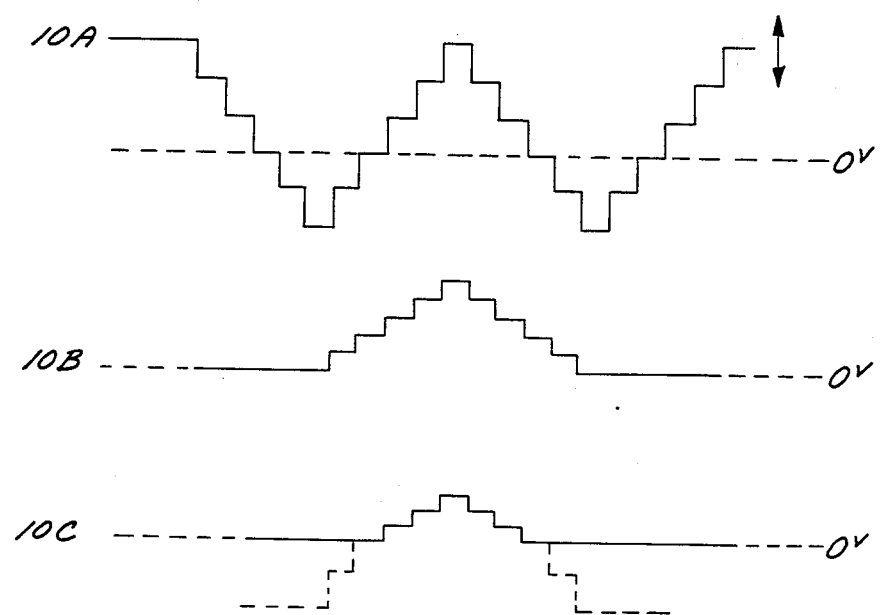
FIGS. 10A, 10B and 10C are diagrams representing the signals generated by the angular hue spread circuitry of FIG. 5 for an expanded thirty color bar chart.

Mixers 110 and 112 transmit the more negative of the signals applied to their inputs. Therefore, the wave form of the signal at the output of mixer 110 is a combination of FIGS. 9A and 9C. The signal representing the selected hue spread applied to terminal 73 serves to bias the signal at the output of mixer 110 upwardly or downwardly, depending upon the angular width of the selected hue sector. This is illustrated in FIG. 10A, Which represents the output of operational amplifier 111. As indicated by the two-headed arrow, the signal produced at amplifier 111 responsive to the expanded color bar component difference signals moves upwardly or downwardly relative to zero volts depending on the amplitude of the selected hue spread representative control signal. FIG. 10B represents the signal at terminal 86 after passing through invertor 114 responsive to the expanded color bar component difference signals, which is fixed relative to zero volts. FIG. 10C represents the signal at the output of clipper 115. As the bias applied by the signal at terminal 73 increases in a positive direction, more of the signal at the output of mixer 112 lies above zero volts and the angle of the selected sector widens because clipper 115 passes a wider band of hue, and vice-versa. As previously described, only when the uncorrected video signals applied to circuitry 71 lie within the selected hue sector about the selected hue angle is a signal produced at terminal 116. With reference to FIGS. 10A, 10B and 10C, operation of the invention may be understood by viewing changes in the selected hue angle as lateral shifting of the wave forms and changes in the selected hue spread as up and down shifting of wave forms 10A and 10C.

Figure 13:
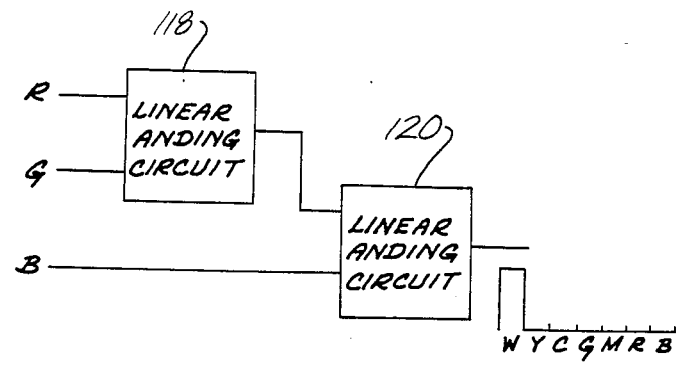
FIG. 13 is a schematic diagram of a portion of a white amplifier and matrix.

The white amplifier and matrix 19, shown in FIG. 1, includes a pair of linear ANDing circuits 118 and 120 (FIG. 13), which is a circuit analogous to an analog form of an ANDing circuit for combining the three RGB signals together so that the output of the second linear ANDing circuit 120 contains only the white signal portions from each of the red, green and blue signals. The output of the pair of linear ANDing circuits is shown in FIG. 13. The output is then applied to a trio of multipliers, in a manner similar to the application of the output from the angular hue spread circuitry 78 to the R-Y multiplier 88, B-Y multiplier 89 and luminance multiplier 90. Effectively, a separate channel may be provided in FIG. 2 for correction using the white signal. It should be understood that "white" here refers to all neutral signals lacking video color information. Alternatively, the output may be switched onto each of the six channels between the mixer 112 and the clipper 115 (FIG. 5) to enable processing thereafter in a manner identical to the processing of the color signals to modify an isolated grey level without affecting any other grey level or any color in the scene. The outputs of the three multipliers can then be combined with the output signals from the color correction channels on the common output buss for producing a corrective video output.

Figure 14:
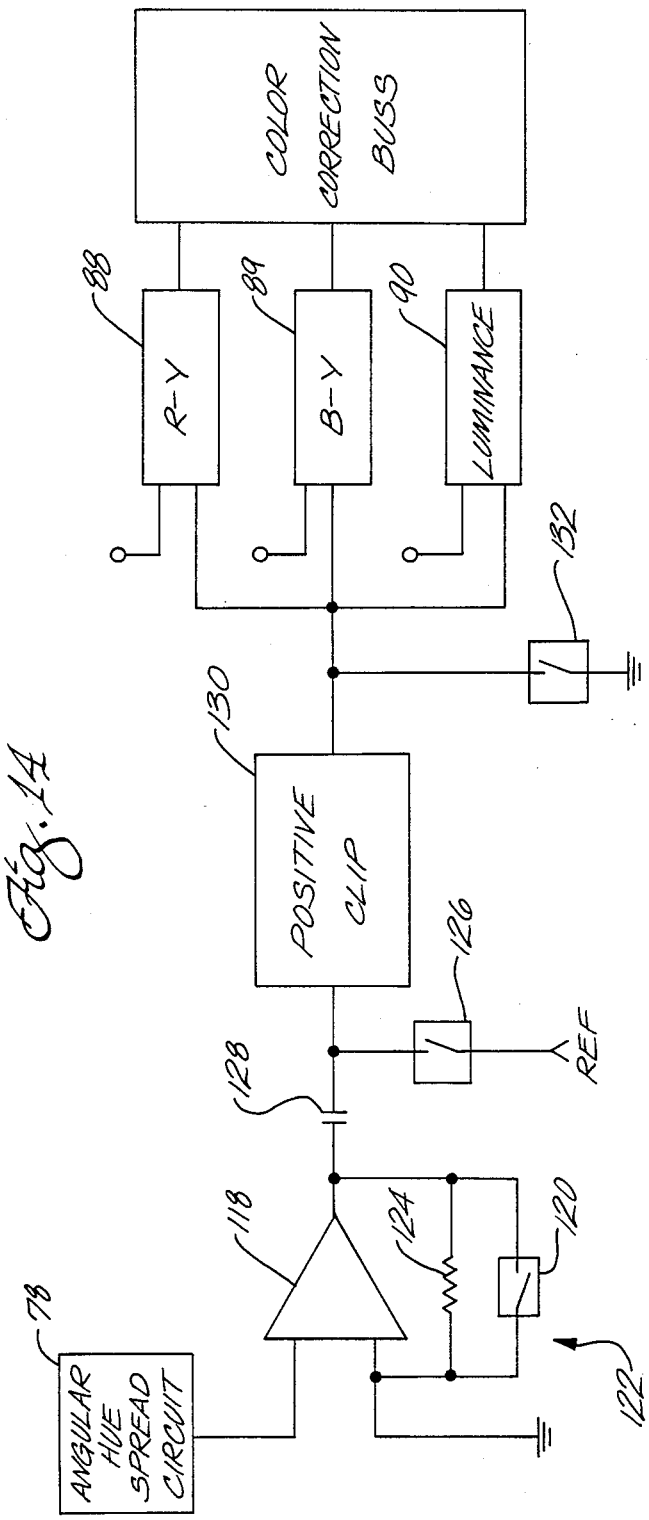
FIG. 14 is a schematic diagram of a uniform saturation, hue and luminance correction circuit.

The uniform signal processing means 79 for allowing uniform saturation, hue or luminance correction signals through the multipliers 88–90 (FIG. 3) is shown in FIG. 14. By means of the uniform signal processor 79, isolated correction signals as defined by the angular hue rotation circuitry 71 and the angular hue spread circuitry 78 (FIG. 3) can be processed so that the uncorrected hue signals can be modified to have constant saturation levels by addition or subtraction of a correction signal having a constant saturation level. Additionally, hue signals can be entirely eliminated and replaced by the processed correction signals having identical hue signals but which have equal saturations. The uniform signal processor can also be used to produce a uniform signal used to modify the hues of the uncorrected video, the luminance and also to modify the neutrals or grey levels in the uncorrected video.

Specifically, the angular hue spread circuitry 78 applies signals representing the hues in the isolated hue region, or hue sector, to an amplifier 118 having a switch 120 in the feedback circuit 122 of the amplifier. Closing of the switch 120 increases the gain of the signal passed through amplifier 118 when the uniform signal processing circuit is activated. When the switch 120 is open, the gain is fixed by resister 124 when no uniform signal processing is to be carried out. In other words, when switch 120 is open, the hue and saturation profile of the isolated color signals are passed through the uniform color processor without modification. A second switch or clamp 126 is coupled to one side of a capacitor 128, the other side of which is coupled to the output of the amplifier 118, for clamping the amplified signal to a fixed voltage reference level.

The clamped signal is then applied to a clipping circuit 130. The clipping circuit 130 is a positive clip for clipping the isolated color signals to a fixed maximum voltage representing constant saturation for each of the hue signals passed from the angular hue spread circuitry. Here again, if no uniform signal processing is to be carried out, the clipping circuit is bypassed (not shown).

The output of the clipping circuit is applied to each of the R-Y multiplier 88, the B-Y multiplier 89 and the luminance multiplier 90 after being clamped to 0 volts DC by a clamp 132. The correction video signals are then output on the color correction buss as previously described. The clamps 126 and 132 operate with or without the uniform signal processing.

The described uniform correction processing circuit can be used to process an isolated color signal, a luminance signal or a white signal. The isolated color signal is obtained in the preferred embodiment by applying the color difference signals to the input of the angular hue rotation circuitry. A selected luminance signal is obtained from a luminance signal applied to the input of a variable clipping circuit, to be described below, and then passed to the input of the uniform correction processor. A selected white signal is obtained in the same way as a selected luminance signal.

FIG. 15 shows several curves representing multibar signals which might be passed in the R-Y channel. FIG. 15A represents an uncorrected hypothetical signal which may occur on the R-Y channel. While the signal is essentially the same as the RED color component signal as shown in FIG. 11, this signal will be used for purposes of illustration as though it were passed undifferentiated by the luminance (Y) signal on the R-Y channel. The curves in 15B, 15D, 15F and 15H represent examples of video color correction signals which may be isolated, modified and passed through a channel of the color correction circuit (FIG. 3) (e.g. so that the correction signal can be subtracted from the uncorrected signal in 15A). When one of these correction signals is individually applied to the uncorrected video color signal on the R-Y channel, a resultant or corrected color video signal is produced in the R-Y channel, such as is represented by the curves in 15C, 15E, 15G and 15I, respectively. Finally, the signal shown in 15J represents a correction signal to be applied to the R-Y channel to entirely eliminate the signal in 15A, to be replaced by a corrected signal 15K having substantially equal saturations for substantially all of the hues originally present in the R-Y channel.

Considering the curves of FIG. 15 in more detail, the signal represented by the curve in 15B represents a correction signal in the selected hue sector corresponding to selected hues in the uncorrected video in 15A and which will be summed with the signal represented by the curve in 15A to produce a resultant color corrected signal represented by the curve in 15C. The correction signal in 15B is one which has not been processed by the uniform correction processor, and therefore has bypassed the processor. The correction signal is shown as being centered on the signal in the R-Y channel, though it should be understood that the correction signal can be centered on any selected hue. The correction signal represents a relatively small change in the saturations for the hues in the selected hue sector, relative to the correction which would be achieved using the correction signal of 15F, for example. As can be seen by considering the resultant corrected color video signal in 15C, the relative differences in the saturations of adjacent corrected hues is small. However, if a uniform saturation is desired in the corrected color video signal for those same hues, just as many of the adjacent hues in the uncorrected signal have a uniform saturation represented by the top of the signal in 15A, such a correction could not be done using the isolated correction signal shown in 15B.

In order to accomplish such a correction without a significant change in the relative saturations of the hues in the selected hue sector, a correction signal such as that shown in 15D can be used to produce the resultant corrected video signal in the R-Y channel represented by the curve in 15E. The correction signal is obtained by applying the isolated correction signal from the angular hue spread circuitry 78 to the amplifier 118 when the uniform signal processor circuit is "ON". The isolated correction signal input to the uniform correction processor may be one such as represented in 15B. The gain of the signal is increased approximately ten fold and then clamped to the reference voltage. The clipping circuit 130 clips the top of the signal to produce a signal such as that shown in 15D wherein all the hues represented in the selected hue sector have substantially equivalent levels or saturations. The signal is then applied to the R-Y multiplier, the B-Y multiplier and the luminance multiplier to be multiplied as desired and passed to the color correction buss. When applied to the R-Y channel, the resultant signal on the R-Y channel will appear substantially as shown in 15E.

The signal represented in the curve of 15F shows a correction signal over the selected hue sector similar to the correction signal shown in 15B but having a larger magnitude. When the correction signal is applied to the R-Y, B-Y and luminance multipliers and output on the color correction buss, bypassing the uniform signal processor 79, the resultant corrected signal on the R-Y channel shows a substantially larger change in the saturation levels of the hues falling within the selected hue sector. Notably, the differences in saturations between adjacent hues is substantially greater resulting in a noticeably increased difference in saturation of the colors within the selected hues when the video is viewed on a monitor or television screen.

Where the original, uniform saturation profile in the uncorrected video signal (15A) is to be maintained, the correction signal over the selected hue sector can be processed in the uniform signal processor 79 to produce a correction signal as represented in 15H having a substantially uniform level over the selected hue sector. The resultant corrected video signal on the R-Y channel represented by the curve in 15I shows a substantially uniform or equal saturation for those hues in the selected hue sector. This result may be desired, for example, where the flesh tones on a person's face are desired to have a uniform saturation level.

As can be seen in the curves represented in 15A–15I, the uniform signal processor circuitry 79 can be used to produce a uniform correction. That correction signal may be used to modify the saturation, hue or luminance of the uncorrected video signal using only a single correction channel. A relatively uniform correction can be applied over substantially the entire selected hue sector. The uniform processor operates on the correction signal for the selected hue sector after the correction signal derived from the color difference signals is defined in the angular hue rotation circuitry and the angular hue spread circuitry. If the correction signal is developed from the luminance or white signals, they are obtained from the variable hard clip discussed below.

The signals represented in 15J and 15K schematically depict a methodology for producing a resultant corrected signal having uniform saturation levels where the original video signal had hues with differing saturation levels. This method uses two correction channels. In the first channel, a correction signal represented in 15J, which is identical to the original video signal in the R-Y channel shown in 15A is subtracted from the signal on the R-Y channel to eliminate the original signal. In the second channel, the color correction signal over the selected hue sector is processed by the uniform signal processing circuitry 79 to produce a correction signal, as represented in 15K, having a substantially uniform saturation over substantially all of the hues in the selected hu (R)sector. The resultant corrected color video signal on the R-Y channel is that shown in 15K since the first channel eliminated the original uncorrected signal on the R-Y channel.

In a further embodiment of the present invention, the clipping circuit 130 can include a variable clipping circuit so that the clipping circuit in a first channel can clips at one level (e.g. 40%) while the clipping circuit in a second channel clips at a second level (e.g. 60%). This allows modification of the uncorrected signals to change the levels of grays or neutrals or to have different levels of saturations.

In an embodiment of the clipper 115 (FIG. 5), the clipper can be broken down into three stages as shown in FIG. 16. The signal from the nonadditive mixer 112 is applied to a first soft clip 134. The soft clip is at a relatively small level, too small to bring the level to the base line of the video signal. The soft clip removes approximately 60% of the unwanted signal to leave an intermediate correction signal to be further processed to obtain the isolated color correction signal. The clipped intermediate signal is then amplified in an amplifier 136 before being applied to a hard clipping circuit 138. The hard clipping circuit again clips the lower portion of the isolated color correction signal so that no signals below a predetermined level are passed to the output of the color correction channel. The output of the hard clipping circuit 138 is then amplified in a second amplifier 140 and applied to a variable hard clipping circuit 142 which includes a multiplier 144. The other input of the multiplier 144 is the variable clip signal amplified in an amplifier (not shown). The lower level of the variable clip is fixed at 0 volts while the video signal is moved up and down. The DC offset is moved up and down to vary the point at which the third clip is applied to the video signal. If the third clip is opened up all the way, the second hard clip 138 insures that nothing below the predetermined level passes to the output of the color correction channel.

With the three stage clipping circuit, the relative amplitudes of the varied signals in the selected hue sector do not change drastically as they would in the case of a single clip.

The three stage clip also allows the luminance signal or the white signal to be applied to the end of the correction circuit and isolated using the variable clip circuit. The luminance signal or the white signal can be selected over the isolated color signal using the switch 146, controlled by a logic input signal. For example, a luminance signal may be isolated and passed to the R-Y, B-Y, and luminance multipliers, 88–90, respectively, bypassing the uniform correction processor 79. The isolated signal can then be modified using the multipliers to produce a correction signal which can modify luminance, hue or saturation. Alternatively, the uniform signal processor may be used to produce a uniform correction signal to be used to produce a correction signal as previously described. The white signal may be isolated and processed in a like manner to vary the grey levels in the video signal.

The described embodiment of the invention is only considered to be preferred and illustrative of the invention concept; the scope of the invention is not to be restricted to such embodiment. Various and other numerous arrangements may be devised by one skilled in the art without departing from the spirit and scope of this invention. The invention may be employed in a telecine film chain of in video tape-to-video tape conversion equipment, or any other setting in which video component color signals appear.

I claim:

1. A color correction system for manipulating signals representing colors, the system comprising:
    input means for accepting signals representing colors defining hues and respective saturations;
    a color correction circuit for accepting the signals from the input, and including:
        color selection means for producing from the input signals a selected signal at an output proportional to the saturation of a portion of the input single in a selected hue region,
        signal processing means coupled to the output of the color selection means for accepting the selected signal and for processing the signal to produce an output signal having substantially constant saturation, and
        means for providing the output signal as a correction signal; and
    means for combining the signals from the input means with the correction signal and producing resultant signals and for passing the resultant signals to an output.

2. The system of claim 1 wherein the color selection means includes means responsive to a first control signal for defining hue angle, and means responsive to a second control signal for defining a hue sector containing the hue angle for isolating the selected signal.

3. The system of claim 1 wherein the signal processing means comprises a clipping circuit for clipping the signal to produce a signal having a substantially constant amplitude.

4. The system of claim 3 wherein the signal processing means comprises means for increasing a gain of the signal before the clipping circuit.

5. The system of claim 4 wherein the correction signal producing means includes an R-Y multiplier and a B-Y multiplier for accepting the clipped signal.

6. The system of claim 1 wherein the correction signal providing means includes means for multiplying the output signal by at least one correction factor to adjust at least one of the hue and saturation of the correction signal.

7. The system of claim 5 wherein the correction signal providing means includes an R-Y multiplier and a B-Y multiplier for accepting the output signal.

8. The system of claim 1 wherein the correction signal providing means includes means for combining the output signal with a hue and saturation control signal to produce a correction signal having a desired hue and saturation.

9. A color correction system for manipulating signals representing colors, the system comprising:
    input means for accepting signals representing colors defining hues and respective saturations;
    a color correction circuit for accepting the signals from the input, and including:
        color selection means for producing from the input signals a selected signal at an output proportional to the saturation of a portion of the input signals in a selected hue region,
        signal processing means coupled to the output of the color selection means for accepting the selected signal and for clipping the signal to produce an output signal having substantially constant saturation and
        means for providing the output signal as a correction signal; and
    means for combining the signals from the input means with the correction signal and producing resultant signals and for passing the resultant signals to an output.

10. The system of claim 6 wherein the color selection means includes means responsive to a first control signal for defining a hue angle, and means responsive to a second control signal for defining a hue sector containing the hue angle for isolating the selected signal.

11. The system of claim 1 wherein the correction signal providing means includes mean for combining the output signal with a luminance control signal to produce a correction signal for a luminance signal.

* * * * *

UNITED STATES PATENT AND TRADEMARK OFFICE
CERTIFICATE OF CORRECTION

PATENT NO. : 4,953,008
DATED : August 28, 1990
INVENTOR(S) : Michael C. Kaye

It is certified that error appears in the above-identified patent and that said Letters Patent is hereby corrected as shown below:

Column 3, line 10, "With" should read --with--.

Column 3, line 46, after "in", insert --FIG. 1;--.

Column 4, line 58, "of or - 5 volts DC" should read --of + or - 5 volts DC--.

Column 5, line 5, "directlY" should read --directly--.

Column 7, line 30, "angle over" should read --angle a over--.

Column 8, line 2, "5" should read --S--.

Column 8, line 13, "for" should read --form--.

Column 8, line 55, delete "or correction factor".
Column 8, line 57, after "signal", insert --or correction factor--.

Column 14, line 39, "hu $^R$sector" should read --hue sector--.

Column 14, line 46, "clips" should read --clip--.

Column 16, line 5, "defining hue angle" should read --defining a hue angle--.

Column 16, line 23, "claim 5" should read --claim 6--.

UNITED STATES PATENT AND TRADEMARK OFFICE
CERTIFICATE OF CORRECTION

PATENT NO. : 4,953,008

DATED : August 28, 1990

INVENTOR(S) : Michael C. Kaye

It is certified that error appears in the above-identified patent and that said Letters Patent is hereby corrected as shown below:

Column 16, line 52, "claim 6" should read --claim 9--.

Signed and Sealed this

Seventh Day of April, 1992

Attest:

HARRY F. MANBECK, JR.

*Attesting Officer*  *Commissioner of Patents and Trademarks*